United States Patent
Bar-On

(10) Patent No.: US 8,687,902 B2
(45) Date of Patent: Apr. 1, 2014

(54) SYSTEM, METHOD, AND COMPUTER PROGRAM PRODUCT FOR DECOMPRESSION OF BLOCK COMPRESSED IMAGES

(75) Inventor: Tomer Bar-On, Petah Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/434,030

(22) Filed: Mar. 29, 2012

(65) Prior Publication Data

US 2013/0259394 A1 Oct. 3, 2013

(51) Int. Cl.
 *G06K 9/36* (2006.01)
(52) U.S. Cl.
 USPC ............ 382/233; 382/232; 713/176; 713/179
(58) Field of Classification Search
 USPC ......... 382/233, 232, 124, 166, 167, 239, 245, 382/240, 246, 231; 713/176, 181, 189, 179; 709/223, 201, 203; 380/201.269
 See application file for complete search history.

(56) References Cited

U.S. PATENT DOCUMENTS

| | | | | |
|---|---|---|---|---|
| 4,652,996 | A * | 3/1987 | Bowden | 711/118 |
| 5,414,772 | A * | 5/1995 | Naccache et al. | 380/46 |
| 5,450,562 | A * | 9/1995 | Rosenberg et al. | 711/119 |
| 5,910,989 | A * | 6/1999 | Naccache | 713/173 |
| 5,943,421 | A * | 8/1999 | Grabon | 380/269 |
| 6,151,025 | A | 11/2000 | Yen et al. | |
| 2004/0015695 | A1 * | 1/2004 | de Queiroz | 713/176 |
| 2004/0015697 | A1 * | 1/2004 | de Queiroz | 713/176 |
| 2006/0047967 | A1 | 3/2006 | Akhan et al. | |
| 2009/0249222 | A1 * | 10/2009 | Schmidt et al. | 715/751 |
| 2010/0037049 | A1 | 2/2010 | Otis et al. | |
| 2011/0138191 | A1 * | 6/2011 | Bond | 713/189 |

FOREIGN PATENT DOCUMENTS

| | | | |
|---|---|---|---|
| KR | 10-2008-0026772 A | 3/2008 | |
| KR | 10-2009-0098789 A | 9/2009 | |

OTHER PUBLICATIONS

International Search Report and Written Opinion received for International Application No. PCTUS2013033718, mailed Jul. 25, 2013, 10 pages.

* cited by examiner

*Primary Examiner* — Mekonen Bekele
(74) *Attorney, Agent, or Firm* — Garrett IP, LLC

(57) ABSTRACT

A system, method, and computer program product that may use a cache in the decompression of block compressed image data. Each data entry in the cache may represent decompressed image data corresponding to a compressed block of an image. The indices of the cache are keys, where each key is the output of a hash process that is performed on the corresponding compressed block. Decompression of a compressed block may be performed by hashing the compressed block to generate the key. The key may be used to access the cache. The decompressed data indexed by the key may be read and used as the decompressed version of the compressed block. If no data corresponds to the key, or if the cached data indexed by this key is otherwise invalid, then a conventional decompression process may be applied to the compressed block to yield the decompressed data. This decompressed data may then be written to the cache, at a location corresponding to the key.

18 Claims, 9 Drawing Sheets

100

| a | b |
|---|---|
| c | d |

FIG. 1

SYSTEM, METHOD, AND COMPUTER PROGRAM PRODUCT FOR DECOMPRESSION OF BLOCK COMPRESSED IMAGES

BACKGROUND

The digital representation of an image typically includes a significant amount of data, in order to capture colors, textures, opacity, etc. As a result, the processing or transmission of an image may be time-consuming. As a result, the speed at which an image is processed or communicated represents a system design issue that needs to be addressed. Because there is a need for fast computing and transmission of the data representing an image, compression of the data is often employed. This facilitates resolution of some of the computational speed issues, the conservation of bandwidth, and the conservation of memory capacity.

The processes of compression and decompression, however, may create issues of their own. Such processes are not trivial, but may need to take place quickly in order to allow timely image processing or output. In particular, traditional decompression processes may be slow and computationally expensive, whether performed in hardware or software. Sometimes, for example, decompression may be performed using dedicated hardware in a graphics processing unit (GPU). Nonetheless, speed remains at issue, especially when real time processing is desired.

BRIEF DESCRIPTION OF THE DRAWINGS/FIGURES

FIG. 1 illustrates an uncompressed block of an image.

Figure 2:
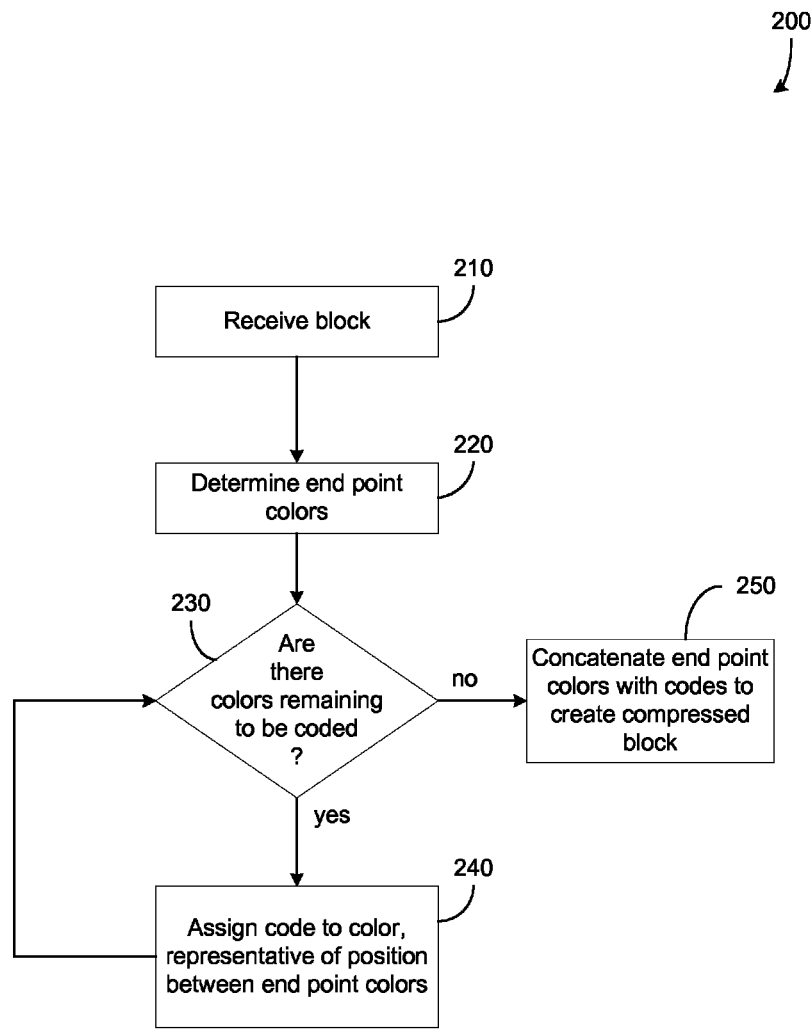
FIG. 2 is a flow chart illustrating a block compression process.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The system and method described herein may use a cache in the decompression of block compressed image data. Each data entry in the cache may represent decompressed image data corresponding to a compressed block of an image. The indices of the cache may be keys, where each key may be the output of a hash process that is performed on the corresponding compressed block. Decompression of a compressed block may be performed by hashing the compressed block to generate the key. The key may be used to access the cache. The decompressed data indexed by the key may be read and used as the decompressed version of the compressed block. If no data corresponds to the key, or if the cached data indexed by this key is otherwise invalid, then a conventional decompression process may be applied to the compressed block to yield the decompressed data. This decompressed data may then be written to the cache, at a location corresponding to the key.

Figure 1:
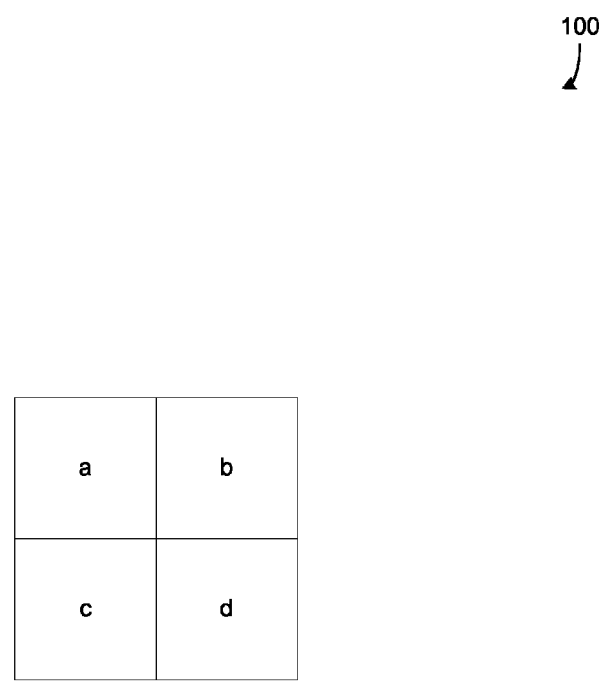

The compression and decompression of an image may be preceded by decomposition of an image into blocks of image data, each of which may be represented digitally. A given block may be modeled as an array of colors occurring in the block. This is illustrated in FIG. 1. A block 100 may be modeled as having a discrete number of colors; block 100 is shown having four colors, shown here as a, b, c, and d. While four colors are shown in this illustration, it is to be understood that for other images or other compression/decompression processes, blocks of image data may be modeled with a different number of colors. Once the set of colors is defined for a block, the block may undergo a block compression process.

A block compression process is illustrated in FIG. 2. The illustrated process compresses a digital representation of a block's colors. At 210, a block may be received. At 220, two end point colors may be determined. These end point colors may represent the colors that are at the most extreme points (of the colors in the block) in the three-dimensional color space used to model the colors. At 230, a determination may be made as to whether there are additional colors to be coded in a compressed form. If there are, for example, four colors in the block, then there would be two additional colors to be coded apart from the end point colors. At 240, one of the remaining colors is assigned a code that may represent a location on a line segment between the end point colors in the three-dimensional color space. The location on the line segment may represent the point on the segment that is closest to the actual location in space of the color to be coded. The location on the line segment may be represented, or coded, as a distance from one of the end point colors. In this way, the color is not represented explicitly as three color coordinates, but rather as a distance from an end of a line segment. This distance may be viewed as the code for the color. As a result, the color is represented (i.e., coded) using fewer bits. The process may then return to 230, where another determination may be made as to whether there are additional colors to be coded in the block.

Figure 3:
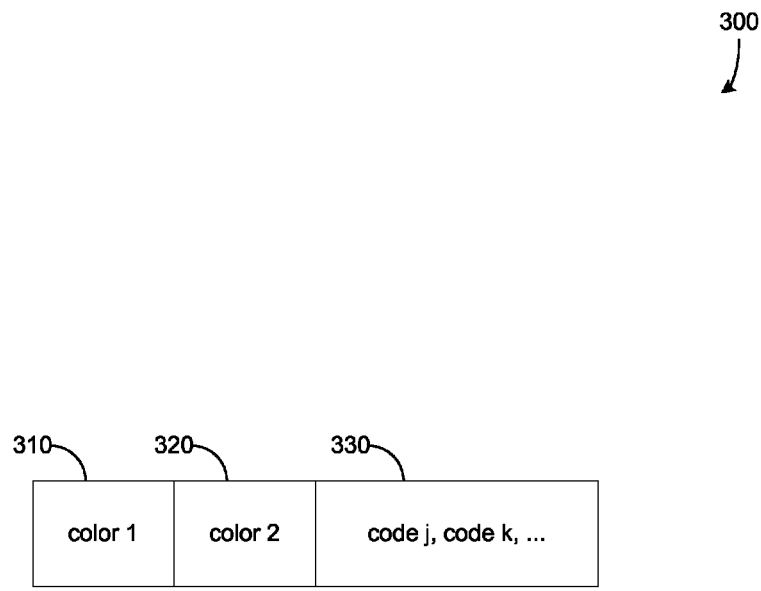
FIG. 3 is a diagram illustrating a compressed block.

If there are no more colors to be coded, then at 250, the coded colors may be concatenated with the representations of the end point colors to form the compressed block. This is illustrated in FIG. 3. The two end point colors may be defined explicitly in one or more fields. These fields are shown as 310 and 320. Field 330 may include the codes for the colors, presented in a predefined order. The formatted data 300 may represent the compressed block of image data.

Figure 4:
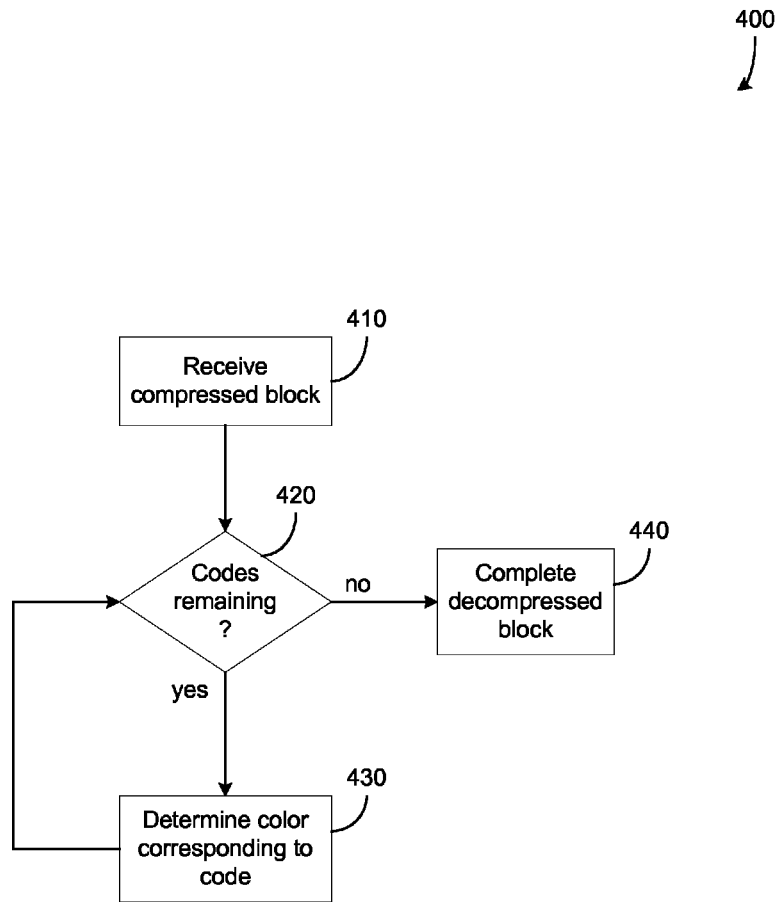
FIG. 4 is a flow chart illustrating a block decompression process.

A method for a decompression process is illustrated in FIG. 4. At 410, a compressed block of image data is received, where the block may have been compressed as described above. At 420, a determination may be made as to whether there are color codes that have yet to be processed. If so, then at 430, a code is converted into a color. Given the defined end point colors and the line segment between them in the three-dimensional color space, the code is used as a distance from one of the end points. The resulting color at that location is used as an approximation of the original color, and represents the decompressed color. The process may then return to 420, where another determination may be made as to whether there are additional codes remaining that need to be converted into decompressed colors. If there are no unprocessed codes remaining, then at 440 the decompression of the compressed block will have been completed.

Figure 5:
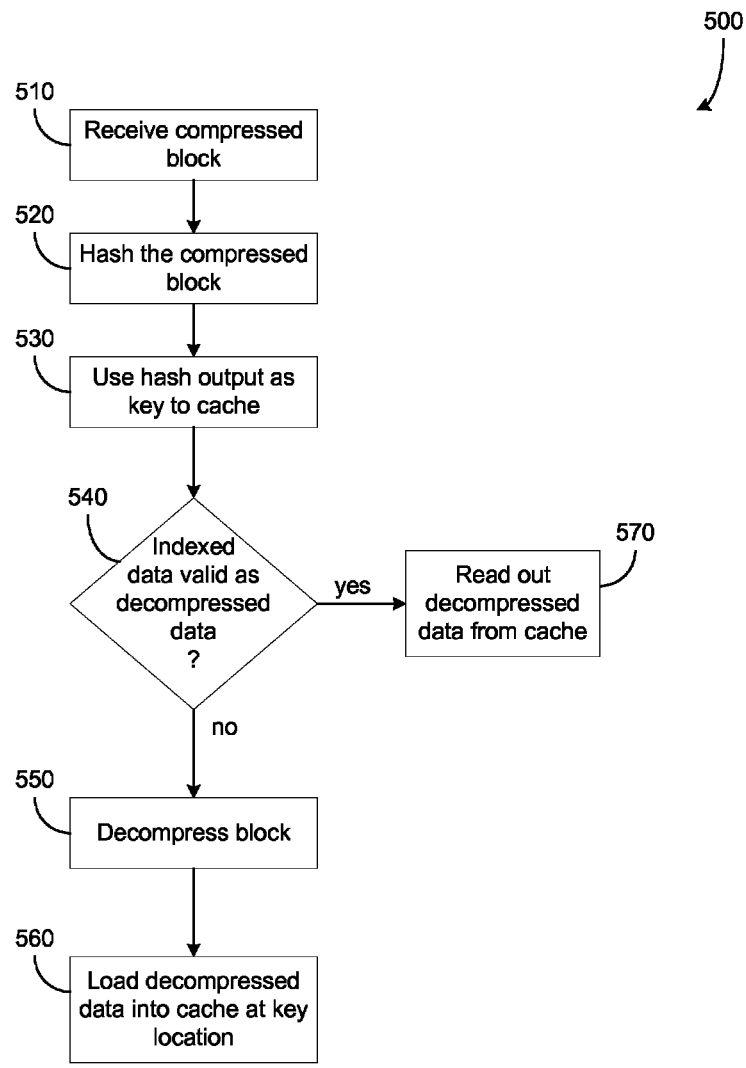
FIG. 5 is a flow chart illustrating a block decompression process according to an embodiment.

A method for decompression is illustrated in FIG. 5, according to an embodiment. At 510, a compressed block of image data may be received. At 520, the block may undergo a hash process. Any deterministic hash operation known to persons of ordinary skill in the art may be used. In an embodiment, the hash operation may comprise a modular reduction. For example, the binary value of the compressed block may be reduced by a modulus of 255.

At 530, the resulting hash output may be used as a key to a particular cache location, where the cache may store decompressed blocks that correspond to compressed blocks. At 540, a determination may be made as to whether the cached data at the location corresponding to the key is valid as decompressed data corresponding to the compressed block. In an embodiment, this check may be a determination of whether the endpoint colors as they are represented in the appropriate fields of the compressed block match the fields in the cached data that would normally hold endpoint colors, assuming that this cache location were holding a decompressed block. If not, then at 550 a conventional decompression may be performed on the compressed block. An example of such a decompression process is shown in FIG. 4. At 560, the decompressed block resulting from this conventional decompression may be loaded into the cache at the location designated by the key (i.e., the hash output). Note that this may be used as a mechanism for populating the cache. If the key leads to an empty location in the cache, the validation attempt at 540 will fail, and conventional decompression may be performed at 550. The result of this decompression may then be loaded into the cache at 560.

If the data at the location designated by the key proves to be valid, as determined at 540, then at 570 this data may be read out as the block of decompressed image data corresponding to the initially received compressed block.

Figure 6:
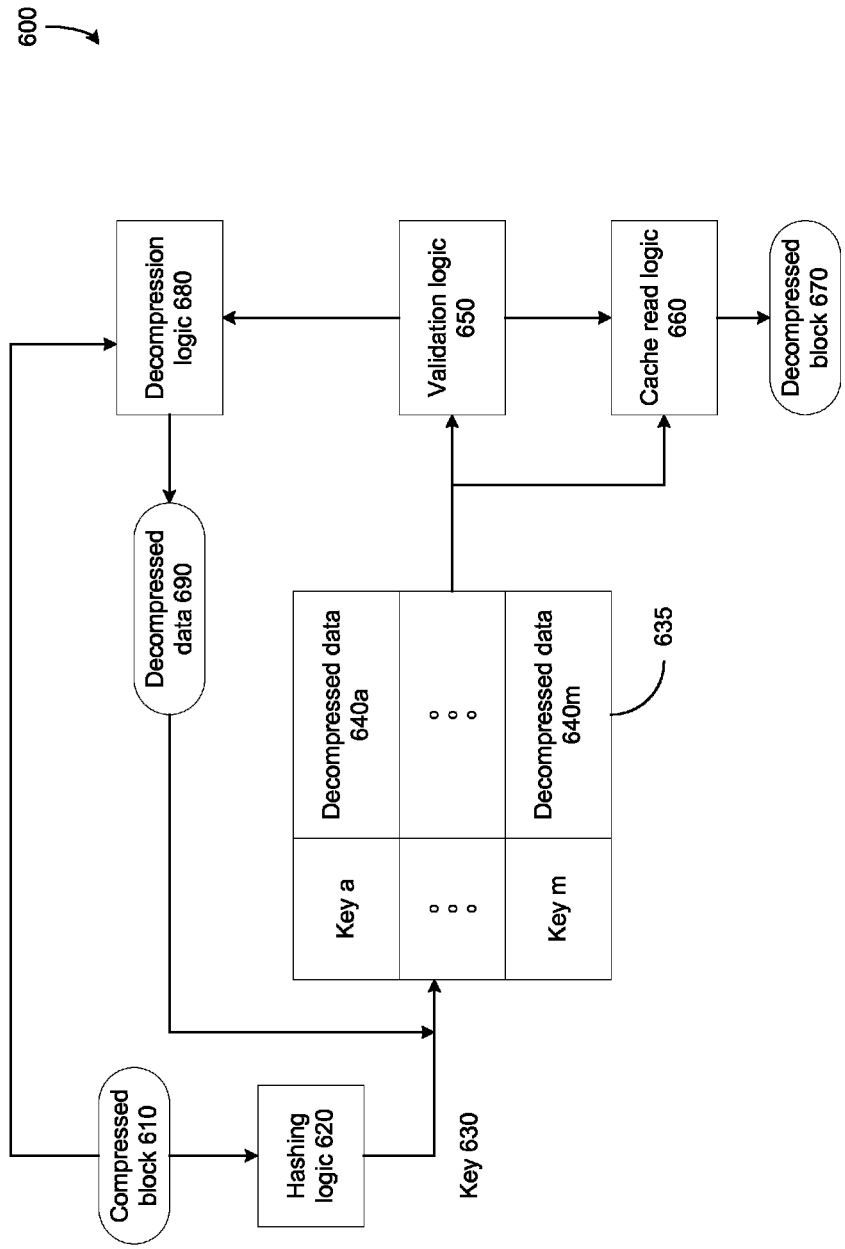
FIG. 6 is a data flow diagram illustrating block decompression, according to an embodiment.

The decompression process is illustrated as a data flow diagram in FIG. 6. A compressed block 610 may be input to hashing logic 620. As noted above, any deterministic hash operation known to persons of ordinary skill in the art may be used. In an embodiment, the hash operation may comprise a modular reduction. For example, the binary value of the compressed block may be reduced by a modulus of 255. In alternative embodiments, a modular reduction employing a different modulus may be applied. The resulting output of hashing logic 620 may be a key 630.

The key 630 may be used to access a particular location in a cache 635. The cached data stored at this location may be decompressed data 640*i*. This cached data may be input to validation logic 650. As described above, the processing of this module may include a determination as to whether decompressed data 640*i* includes endpoint colors that match those represented in the endpoint color fields of compressed block 610. This check may be implemented as a bitwise comparison. If this validity check is passed, then cache read logic 660 may be enabled, and decompressed data 640*i* may be read from the cache and treated as the block of decompressed image data 670 corresponding to compressed block 610.

If the validity check of logic 650 fails, then decompression logic 680 may be enabled. Compressed block 610 then may be decompressed by decompression logic 680, yielding decompressed data 690. In an embodiment, decompression logic 680 may include a process such as that shown in FIG. 4. The resulting decompressed data 690 may then be written to the cache 635 at the location identified by key 630.

Any of hashing logic 620, validation logic 650, cache read logic 660, and decompression logic 680 may be implemented in software, firmware, hardware, or any combination thereof. Cache 635 may be implemented using any data structure and memory medium known to persons of ordinary skill in the art. Cache 635 may be stored in random access memory, for example, or implemented in any known volatile or non-volatile memory technology, such as a hard disk, flash memory, etc.

Note that the discussion above assumes that the original compression process uses a single line segment in the color space for a given block, with two end point colors. In alternative systems, there may be more than one line segment used, so that there may be additional end point colors. In such a case, compression would require coding that uses additional data to specify a particular line segment. Decompression, in this case, would also require accommodation of this additional data when generating decompressed data to populate the cache, according to an embodiment. Moreover, compression may not be limited to the use of line segments in a color space. Alternative geometric constructs may be used for purposes of coding colors and achieving compression, as would be understood by persons or ordinary skill in the art.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The term software, as used herein, may refer to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory, read-only memory, or other data storage device.

Figure 7:
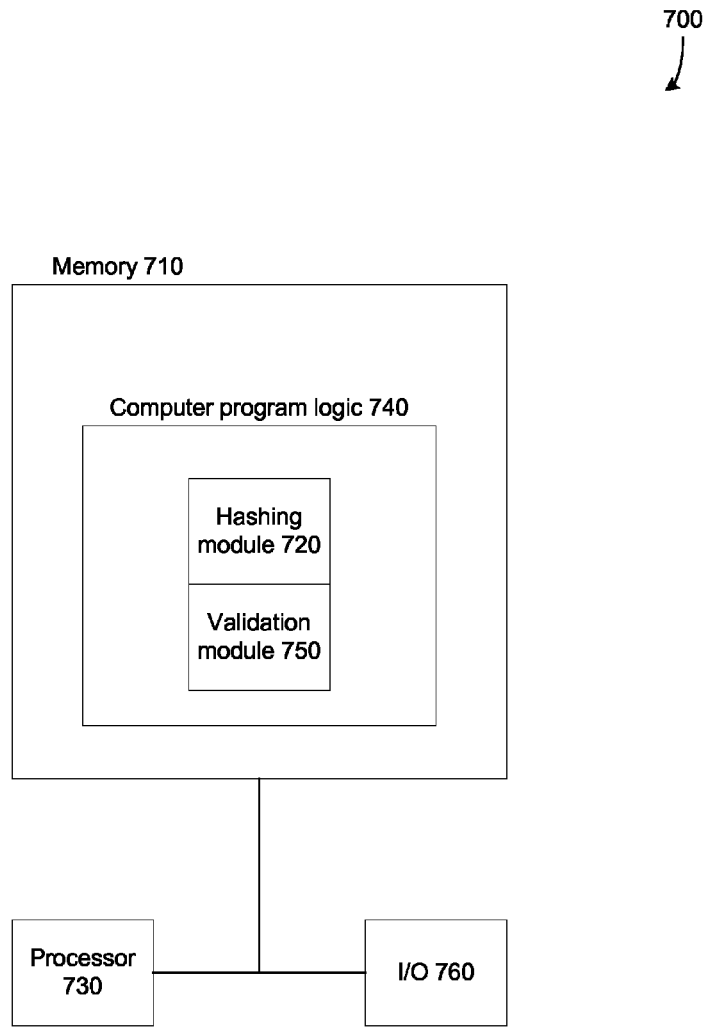
FIG. 7 is a block diagram illustrating a software or firmware implementation of certain features of an embodiment.

A computing system that executes such software/firmware is shown in FIG. 7, according to an embodiment. The illustrated system 700 may include one or more processor(s) 730 and may further include a body of memory 710. Processor(s) 730 may include one or more central processing unit cores and/or a graphics processing unit having one or more GPU cores. Memory 710 may include one or more computer readable media that may store computer program logic 740. Memory 710 may be implemented as a hard disk and drive, a removable media such as a compact disk, a read-only memory (ROM) or random access memory (RAM) device, for example, or some combination thereof. Processor(s) 730 and memory 710 may be in communication using any of several technologies known to one of ordinary skill in the art, such as a bus. Computer program logic 740 contained in memory 710 may be read and executed by processor(s) 730. One or more I/O ports and/or I/O devices, shown collectively as I/O 760, may also be connected to processor(s) 730 and memory 710.

Computer program logic 740 may include logic that embodies the processing described above. In the illustrated embodiment, computer program logic 740 may include a hashing module 720, which may embody the hashing logic 620 of FIG. 6. As described above, the hashing process may be any deterministic hashing process known to persons of ordinary skill in the art, such as a modular reduction. Computer logic 740 may also include a validation module 750, which may embody validation logic 650 of FIG. 6. As described above, the process embodied by this module may include a comparison of endpoint colors from the compressed block with those in the decompressed data that is accessed by the hash output. In alternative embodiments, decompression logic 680 and/or cache read logic 660 may also be embodied partially or completely as computer program logic in memory 710. In addition, memory 710 may also include a cache, such as cache 635 (not shown in FIG. 7).

Figure 8:
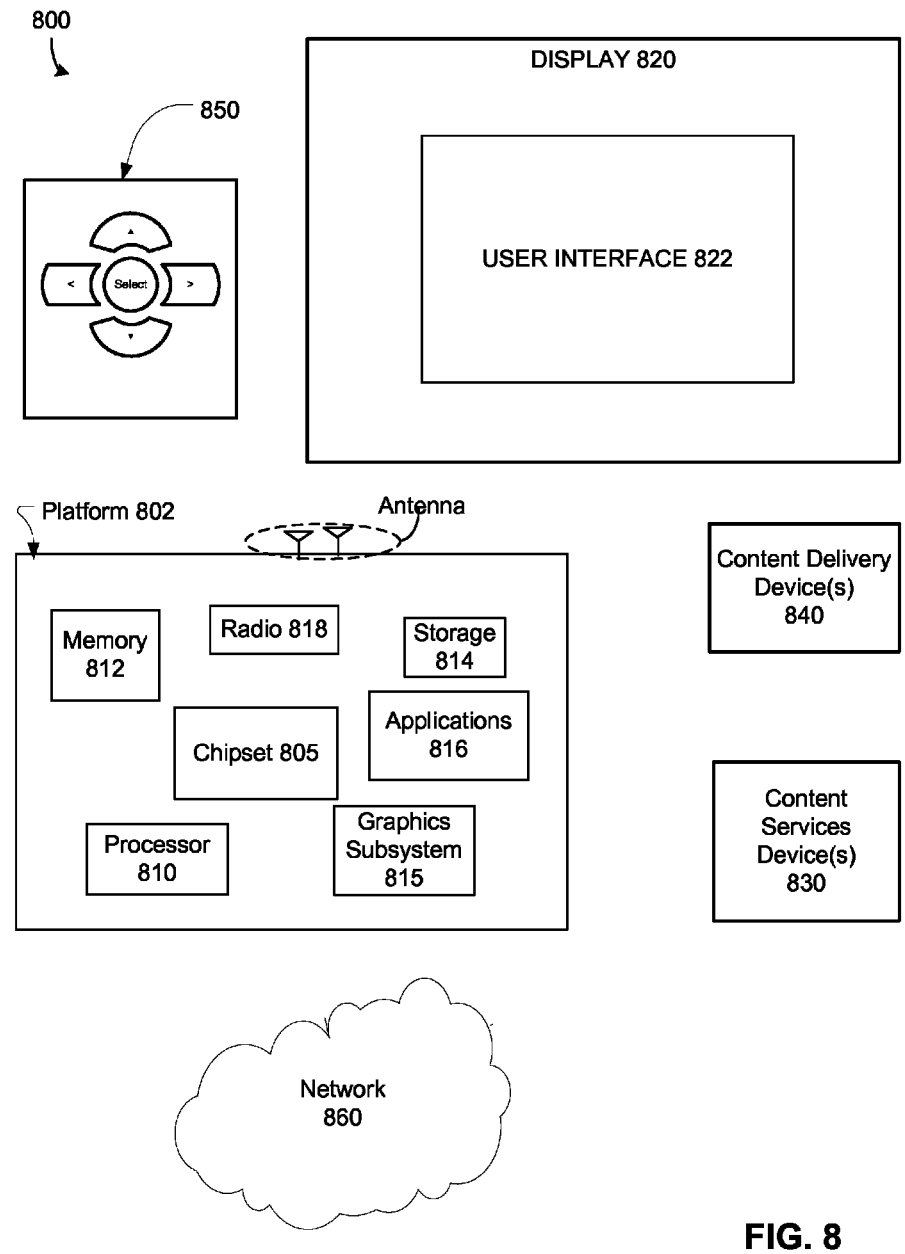
FIG. 8 illustrates a system which may incorporate an embodiment.

The system described herein may be a part of a larger information system. FIG. 8 illustrates an embodiment of the latter. In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 comprises a platform 802 coupled to a display 820. Platform 802 may receive content from a content device such as content services device(s) 830 or content delivery device(s) 840 or other similar content sources. A navigation controller 850 comprising one or more navigation features may be used to interact with, for example, platform 802 and/or display 820. Each of these components is described in more detail below.

In embodiments, platform 802 may comprise any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 810 may comprise dual-core processor(s), dual-core mobile processor(s), and so forth. In an embodiment, processor 810 may correspond to processor 730 of FIG. 7.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 814 may comprise technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 818 may operate in accordance with one or more applicable standards in any version.

In embodiments, display 820 may comprise any monitor or display. Display 820 may comprise, for example, a computer display screen, touch screen display, video monitor, television-like device, and/or a television. Display 820 may be digital and/or analog. In embodiments, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In embodiments, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 receives content such as cable television programming including media information, digital information, and/or other content. Examples of content providers may include any cable or satellite television or radio or Internet content providers. The provided examples are not meant to limit embodiments of the invention.

In embodiments, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but integrated into platform 802 and/or display 820. Embodiments, however, are not limited to the elements or in the context shown or described herein.

In embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off." In addition, chip set 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the invention.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
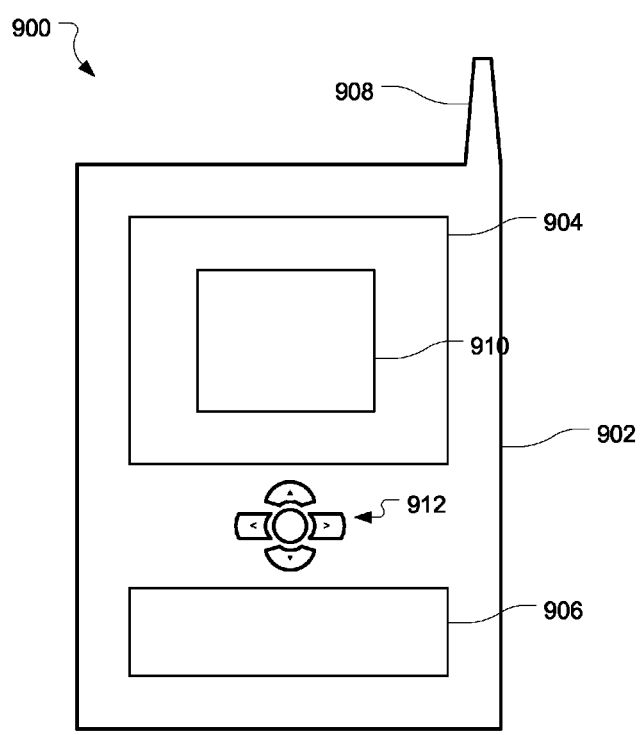
FIG. 9 illustrates a mobile device in which an embodiment may be implemented.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device. I/O device 906 may comprise any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
receiving a compressed block of image data, wherein the block represents at least a portion of an image;
hashing the compressed block thereby deriving a key;
using the key as an index to access cached data in a cache; and
performing a validity check of the cached data that determines if endpoint colors in the compressed block match corresponding fields in the cached data that is indexed by the key.

2. The method of claim 1, further comprising:
using the cached data as the decompressed image data corresponding to the compressed block of image data, when the cached data passes the validity check.

3. The method of claim 1, further comprising:
decompressing the compressed block to produce image data corresponding to the compressed block, when the cached data fails the validity check.

4. The method of claim 3, further comprising:
writing the image data to the cache at a location corresponding to the key, performed after said decompressing.

5. The method of claim 1, wherein said hashing comprises a modular reduction of the compressed block.

6. The method of claim 5, wherein a modulus of the modular reduction is 255.

7. A system, comprising:
a processor;
logic for receiving a compressed block of image data, wherein the block represents at least a portion of an image;
logic for hashing the compressed block to derive a key;
logic for accessing cached data in a cache, using the key as an index to the cached data; and
logic for performing a validity check of the cached data that determines if endpoint colors in the compressed block match corresponding fields in the cached data that is indexed by the key.

8. The system of claim 7, further comprising:
logic for using the cached data as the decompressed image data corresponding to the compressed block of image data, when the cached data passes the validity check.

9. The system of claim 7, further comprising:
logic for decompressing the compressed block to produce image data corresponding to the compressed block, when the cached data fails the validity check.

10. The system of claim 9, further comprising:
logic for writing the image data to the cache at a location corresponding to the key, performed after said decompressing.

11. The system of claim 7, wherein the hashing comprises a modular reduction of the compressed block.

12. The system of claim 11, wherein a modulus of the modular reduction is 255.

13. A computer program product comprising a non-transitory computer useable medium having control logic stored therein, the computer control logic comprising logic to cause a processor to:
receive a compressed block of image data, wherein the block represents at least a portion of an image;
hash the compressed block to derive a key;
use the key as an index to access cached data in a cache; and
perform a validity check of the cached data that determines if endpoint colors in the compressed block match corresponding fields in the cached data that is indexed by the key.

14. The computer program product of claim 13, the computer control logic further comprising logic to cause the processor to:
use the cached data as the decompressed image data corresponding to the compressed block of image data, when the cached data passes the validity check.

15. The computer program product of claim 13, the computer control logic further comprising logic to cause the processor to:
decompress the compressed block to produce image data corresponding to the compressed block, when the cached data fails the validity check.

16. The computer program product of claim 15, the computer control logic further comprising logic to cause the processor to:
write the image data to the cache at a location corresponding to the key, performed after said decompressing.

17. The computer program product of claim 13, wherein said hashing comprises a modular reduction of the compressed block.

18. The computer program product of claim 17, wherein a modulus of the modular reduction is 255.

* * * * *